(12) United States Patent
Lippuner et al.

(10) Patent No.: US 9,341,500 B2
(45) Date of Patent: May 17, 2016

(54) CALIBRATION METHOD AND ANGLE MEASURING METHOD FOR AN ANGLE MEASURING DEVICE, AND ANGLE MEASURING DEVICE

(75) Inventors: Heinz Lippuner, Rebstein (CH); Urs Vokinger, Au (CH); Knut Siercks, Moerschwil (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 999 days.

(21) Appl. No.: 13/510,022

(22) PCT Filed: Nov. 25, 2010

(86) PCT No.: PCT/EP2010/068259
§ 371 (c)(1),
(2), (4) Date: May 16, 2012

(87) PCT Pub. No.: WO2011/064317
PCT Pub. Date: Jun. 3, 2011

(65) Prior Publication Data
US 2012/0222465 A1    Sep. 6, 2012

(30) Foreign Application Priority Data

Nov. 26, 2009 (EP) .................................... 09177211

(51) Int. Cl.
*G01D 18/00*     (2006.01)
*G01D 5/244*     (2006.01)

(52) U.S. Cl.
CPC .................................. *G01D 5/24452* (2013.01)

(58) Field of Classification Search
None
See application file for complete search history.

(56) References Cited

U.S. PATENT DOCUMENTS

| 6,922,899 B2 | 8/2005 | Nakamura et al. |
| 7,797,981 B2 * | 9/2010 | Vasiloiu ............. G01D 5/24452 73/1.79 |

(Continued)

FOREIGN PATENT DOCUMENTS

| AU | 2006224701 A1 | 9/2006 |
| CN | 101253391 A | 8/2008 |

(Continued)

OTHER PUBLICATIONS

European Search Report dated May 25, 2010 as received in application No. 09177211.

(Continued)

*Primary Examiner* — Aditya Bhat
(74) *Attorney, Agent, or Firm* — Mashoff Brennan

(57) ABSTRACT

The invention relates to a calibration method that can be carried out without a reference system for an angle measuring device having a code carrier carrying an absolute position code, and at least two reading heads comprising a fixed, known angle position at an angular distance, wherein the code carrier can be rotated relative to the reading heads, and different angle positions of the code carrier relative to the reading heads can thus be captured. Angle position values of the reading heads in an angular setting are determined and angular error is determined, which are repeated. And, a mathematical analysis method is performed, including determining the parameters of a mathematical function quantifying the angular error, and determining calibration parameters as parameters of the quantifying mathematical function or as a correction or code table derived from the parameters.

28 Claims, 8 Drawing Sheets

(56) References Cited

U.S. PATENT DOCUMENTS

| | | | |
|---|---|---|---|
| 7,825,367 B2 | 11/2010 | Nakamura et al. | |
| 8,031,334 B2 | 10/2011 | Lippuner et al. | |
| 8,091,003 B2 | 1/2012 | Sugie et al. | |
| 8,836,930 B2 * | 9/2014 | Kumagai et al. | 356/138 |
| 2010/0039656 A1 * | 2/2010 | Lippuner ........... G01D 5/24452 | 356/616 |

FOREIGN PATENT DOCUMENTS

| | | |
|---|---|---|
| DE | 40 09 593 A1 | 8/1991 |
| DE | 103 57 602 A1 | 6/2004 |
| DE | 11 2006 003 663 T5 | 12/2008 |
| EP | 0 440 833 B1 | 6/1994 |
| EP | 1 944 582 A1 | 7/2008 |
| KR | 10-0478978 B1 | 3/2005 |
| WO | 2006/097373 A1 | 9/2006 |

OTHER PUBLICATIONS

Geckeler et al., "Calibration of angle encoders using transfer functions", Measurement Science and Technology, Oct. 2006, vol. 17, No. 10, XP020103247, ISSN: 0957-0233, pp. 2811-2818.

Watanbe et al., "Self Calibratable Rotary Encoder", Journal of Physics, 2005, Series 13, pp. 240-245.

Probst, "Self-calibration of divided circles on the basis of a prime factor algorithm", Measurement Science and Technology, 2008, Issue 19, No. 1.

* cited by examiner

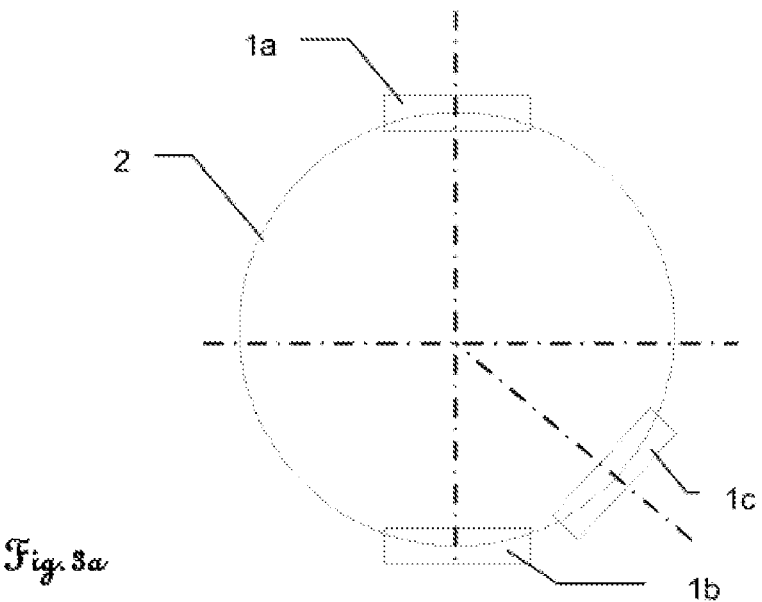
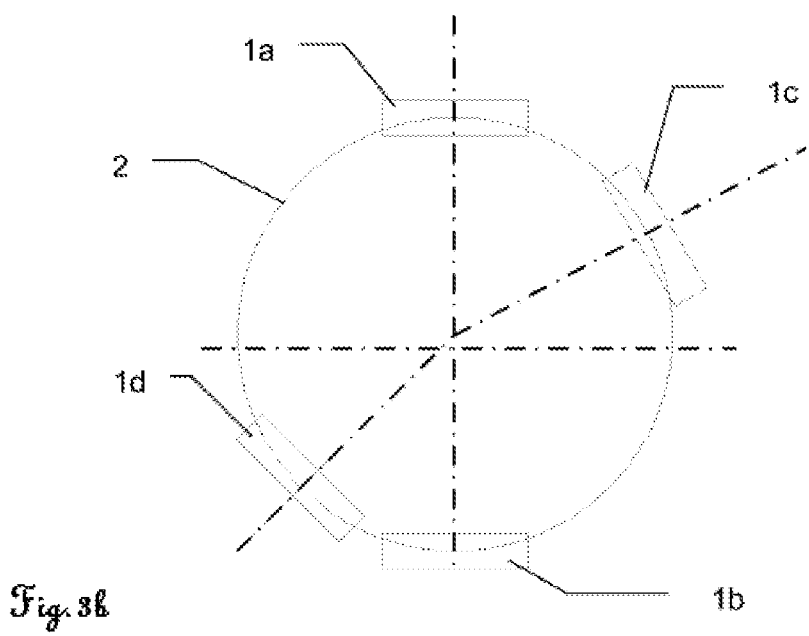

CALIBRATION METHOD AND ANGLE MEASURING METHOD FOR AN ANGLE MEASURING DEVICE, AND ANGLE MEASURING DEVICE

FIELD OF THE INVENTION

The invention relates to a calibration method and an angle measuring method for an angle measuring device, and to a computer program product for carrying out the methods and an angle measuring device with the aid of which a multiplicity of systematic measurement errors can be compensated for.

BACKGROUND

Angle measuring systems have been known in a wide variety of embodiments for many years. They are employed in mechanical and plant engineering and likewise in a wide variety of measuring devices, for example in geodetic devices, coordinate measuring devices or robots. When they are employed, the objective that arises is to determine the angle deviation or corresponding variables derived therefrom, such as velocity or acceleration, for example, between two subsystems rotatable relative to one another in one degree of freedom.

By way of example, such angle measuring systems are used in coordinate measuring devices such as e.g. articulated arms for determining the angle positions in the individual articulations, from which the spatial position of a sensing element fitted to the end of the arm is subsequently calculated.

Such angle measuring devices are also incorporated in geodetic measuring devices, such as a theodolite, for example, which are used to carry out a wide variety of measurement tasks, such as, for example, determining horizontal and vertical angles.

Such angle measuring systems can likewise be found in plants and machines for detecting the positions of machine components such as drives, pivoting heads, throttle valves, rotary tables, and the like. The positions detected in this case can be utilized as position values for measurement purposes, or else for a positioning of components by a drive with a position control loop.

An angle measuring system is constructed from two subsystems movable relative to one another in one degree of freedom. The first subsystem carries a position code, which is detected wholly or partially by a reading head fitted to the second subsystem. By evaluating the signals of the reading head, therefore, an evaluation unit can determine the position of the two subsystems with respect to one another. If the position code is an absolute code, an unambiguous angle position value of the two subsystems with respect to one another can be determined at least in sections. In this case, use is often made of a code table for converting the position code into an angle position value.

A large number of the angle measuring systems available nowadays comprise a plurality of reading heads for determining the angle position values with increased measurement accuracy, for example by reducing the non-systematic errors, such as signal noise, for example, by averaging the individual angle position values. In other applications, a plurality of reading heads can also be utilized for avoiding erroneous measurement values by redundancy.

Owing to the systematic nature of a large number of the errors that occur, the latter are not sufficiently corrected by such averaging. In particular errors which are harmonic with respect to a full revolution, especially low-order harmonic errors such as arise, for example, in the case of rotary encoders as a result of eccentricity, bearing errors, code division errors, etc., in practice often make up a large proportion of the total error. Therefore, it is of particular interest to detect them and correspondingly correct the measurement value. A wide variety of possibilities for calibrating the angle measuring device are known for this purpose.

The calibration of highly accurate angle measuring devices requires extremely high precision calibration apparatuses whose accuracy has to be significantly higher than that of the test specimens to be calibrated. Therefore, such apparatuses are rather complicated to produce and hence cost-intensive. The calibration process is often also associated with very high expenditure of time and labor. It is therefore endeavored to automate this process as far as possible and to dispense with expensive apparatuses.

The publication EP 0 440 833 B1 therefore describes an angle measuring device in which systematic errors are detected and corrected with the aid of a plurality of reading heads, on the basis of a discrete recursive calculation. In this case, for complete correction of the errors over the entire measurement range, owing to the incremental encoding, either a large number of reading heads are required or it is necessary to employ an external reference system which predefines known positions externally. In practice, such a recursive calculation, owing to error propagation and the ever present noise components, also soon encounters limits with regard to the achievable accuracy.

DE 11 2006 003 663 T5 discloses the expansion of the angle errors in a Fourier series, which is particularly suitable for describing and correcting harmonic errors of a rotary encoder over the entire measurement range of 360°. Higher-order harmonic angle errors can be determined accurately with the individual, divided reading head used in that case. Since the small angle covered by the divided reading head is insufficient in the case of the Fourier analysis used for accurately determining low harmonics, it is only by means of a predetermined external positioning of the subsystems with respect to one another that these low-order errors are also made accurately determinable. By way of example, for determining the first harmonic with a Fourier decomposition, measurements at as far as possible opposite positions are advantageous, since said first harmonic can thus be determined to a high proportion and therefore also with a correspondingly good signal-to-noise ratio (see equation 1 below). For this purpose, however, an external reference is necessary in said disclosure, which external reference positions the encoder in predetermined positions in order also to make the low harmonic determinable with sufficient accuracy.

The document EP 1 944 582 A1 discloses a method which, for determining at least one influencing variable that influences the eccentricity in an angle measuring device with a detector arrangement composed of four optical detector elements, a rotatable rotary body with a multiplicity of pattern elements arranged around a pattern center, which are at least partially imaged onto the detector arrangement, resolves the positions and determines the eccentricity of the pattern center relative to a detector center of the detector arrangement. The arrangement of the four detectors used in that case is symmetrical, with a uniform division of the detectors along the circumference of the rotary body, as a result of which, for example, the fourth harmonic cannot be determined.

The document DE 103 57 602 A1 likewise describes an angle sensor in which, during the calibration process, at externally predetermined angle positions, the difference between the measurement value and the externally predetermined angle position is determined and expanded in a Fourier series. The series coefficients are stored and said coefficients, once they have been stored, are used from then on for correcting the measurement values. In that case, too, calibration is possible only with the aid of an external reference.

The article "Self Calibrating Rotary Encoder" by Tsukasa Watanbe et al., which was published in the Journal of Physics, series 13, 2005, on pages 240-245, describes a self-calibrating rotary encoder operating with a plurality of reading heads arranged equidistantly on the circumference.

In the journal "Measurement Science and Technology" issue 19, 2008, R. Probst describes in the article "Self-calibration of divided circles on the basis of a prime factor algorithm" self-calibration of divided circles using a prime factor decomposition for a discrete Fourier transformation.

What is disadvantageous about the known methods is that the error correction, in particular of the low-order harmonic errors, can be determined with sufficient accuracy only with the aid of an externally predefined positioning of the angle measuring system. Consequently, a calibration for reducing these errors is possible only with external aids. This considerably complicates the calibration, particularly after the angle measuring device has been incorporated into a device.

Furthermore, there is also no simple possibility for renewed calibration of the finished device in order, for example, to be able to react to changing ambient conditions or to potential sources of error such as shock and impact stresses, since a highly accurate external positioning of the sensor incorporated in the device is often difficult or even impossible.

SUMMARY

Against this background, therefore, the general object that arises is to improve the angle accuracy of an angle measuring system by compensating for errors present as a result of a calibration.

One specific object, therefore, is to provide a calibration method having improved error compensation.

In particular, it is an object to provide a calibration method which operates without a reference system and with which a calibration can be carried out without any external aids and angle predefinition. An angle measuring system equipped with an for such a calibration method therefore affords the possibility of being calibrated by itself, at any time without the presence of a complex calibration unit. Such a calibration without a reference system and without external aids is also designated hereinafter as self-calibration.

In this case, one specific object of the invention is also to achieve error correction with high accuracy, particularly for the most dominant errors of the angle measuring system, which, particularly in the case of angle measuring devices, often occur in the form of a low-order error that is harmonic with respect to a full revolution.

In this case, furthermore, the fewest possible reading heads should also be used, in order to keep down the costs, complexity and error susceptibility of the angle measuring system.

The energy requirement of an angle measuring system, particularly in the case of mobile use, should also be kept as low as possible, in order, for example, to be able to ensure a long operating time of a battery-operated geodetic measuring device. Therefore, it is a further object to use the fewest possible reading heads and an as far as possible non-computationally intensive correction algorithm. Fewer reading heads and a simple correction method additionally enable a higher evaluation speed of the measuring system and thus the advantage of a shorter measurement time for the user.

These objects are achieved by the realization of the characterizing features of the independent claims. Features that develop the invention in an alternative or advantageous manner can be gathered from the dependent patent claims.

The angle measuring device according to the invention achieves said objects by means of the arrangement according to the invention of a plurality of reading heads determining an absolute position and an associated method for determining error coefficients and a method for correcting the measurement value on the basis of the error coefficients.

In this case, by means of a corresponding arrangement of the reading heads and an absolute encoding, an accurate determination of the harmonic errors, particularly of the low-order harmonic errors that are often dominant, is made possible solely by the angle measuring system itself. These errors determined can subsequently be taken into account on the basis of the described correction method when determining a measurement value and a corrected measurement value can thus be output for further processing.

Harmonic errors can originate, for example, from eccentricities during mounting, poor storage, oblique mounting, division errors of the code disk, wobbling of the code disk, thermal or mechanical warpage, misalignment of the code disk, aging phenomena or other circumstances.

In practice, low-order harmonics, for example up to the 10th or 15th order, are often proportionately dominant in this case. Therefore, it is also deemed necessary to detect particularly these harmonics as accurately as possible, since they make up the largest proportion of the total error. In the case of angle sensors, in this case especially the dominant angle errors as harmonics up to at least the eighth order supply a significant error proportion, and should therefore be contained in the qualifying mathematical function or series with high accuracy, at least with a signal-to-noise ratio of at least 25%.

The angle measuring system used is composed of at least two subsystems moveable relative to one another in one degree of freedom. In this case, the first of said subsystems carries a position code, and the second subsystem is equipped with at least two reading heads for detecting the position code or a part thereof. Alternatively, a plurality of subsystems connected to one another and each having one or more reading heads can also be present. In any case, the arrangement or the design of the reading heads must be suitable for detecting the position code at at least two different angular positions.

The at least two reading heads are fitted relatively to one another at a fixed, known angular distance. The angular positions are chosen in such a way that at least one of the angular distances between two adjacent reading heads differs from the remaining angular distances, in particular wherein the reading heads can have angular distances of more 50 degrees relative to one another.

A reading head having an elongate or two-dimensional sensor can likewise be used if, with the latter, the position code can be read out according to the invention in at least two angular positions which are complained relative to one another in particular by an angle of at least 50 degrees. As a result, the two or more reading heads described here can for example also be realized by an individual physical reading head for the purposes of the invention.

The position code is an absolute position code, from which it is possible to determine an absolute angle position of the reading head at the circumference of the code carrier. Alongside the embodiment as a code disk, rotary encoders having a code carrier are also known in which the angle division is fitted on wound tapes and the position code is read from said tapes.

The encoding of the code carrier can be embodied for example in the form of one code track having serial absolute encoding (e.g. having a maximum sequence) or a plurality of code tracks on the basis of which the position can be determined absolutely (e.g. with more parallel code tracks which represent a binary position encoding). It is also possible merely to use an only partly implemented absolute encoding which is supplemented by an intervening relative encoding.

The angular positions at which the reading heads detect the position code directly influence the determinability of the harmonics. Depending on the angular distance between the reading heads—designated hereinafter by $\Delta$—the weighting factors of the harmonics result according to the following formula:

$$a_h = 2 \cdot A_h \cdot \sin\left(\frac{h \cdot \Delta}{2}\right), \tag{0.1}$$

In the case of more than two reading heads, it is possible in this case, of course, to utilize any desired permutations of the reading heads for determining the differences.

As already described above, by way of example, the first harmonic can be determined particularly advantageously by a difference between the angular positions of 180°. However, in the case of such an arrangement, by way of example, the second harmonic cannot be determined at all.

At small angles of less than 50 degrees between the reading heads, the first- and second-order harmonics can only be determined with low weighting factors, usually below 50%. Since a multiplicity of systematic errors occur precisely with this low periodicity, however, they can be determined without a reference system with reading head distances of less than 50 degrees only to a very limited extend with the accuracy required for a precision measurement.

From the angle position values determined by evaluation of the reading heads at the positions, by means of a series expansion, in particular by means of a Fourier series expansion of the form:

$$\tilde{\Theta}_k = \Phi + \Omega_k + \varepsilon_k(\Theta_k) = \Theta_k + \eta + \sum_{h=1}^{H} A_{h,k} \cdot \cos(h \cdot \Theta_k + \varphi_{h,k}) \tag{0.2}$$

the angle errors of the angle position values are represented as harmonic oscillations in the form of coefficients of said series.

The formulation describes the angle error at a reading head k of an angle measuring system having K heads which are fixedly mounted with respect to a reference angle, on the ideal reference system, at the angular positions $\Omega_k$, and $\Phi$ is the angle of the ideal reference system. The deviation $$\varepsilon(\Theta_k) = \eta_k + \sum_{h=1}^{H} A_{h,k} \cdot \cos(h \cdot \Theta_k + \varphi_{h,k}) \tag{0.3}$$

of the angular position value $\tilde{\Theta}$ from the ideal desired angle of the reference system $$\Theta_k = \Phi + \Omega_k \tag{0.4}$$

is described in equation (0.2) by the sum of cosine terms and/or sine terms in accordance with a Fourier expansion and a noise term $\eta_k$. If the angular position between two arbitrary reading heads $$\tilde{\Theta}_k - \tilde{\Theta}_f = \Theta_k + \eta_k - (\Theta_f + \eta_f) + \tag{0.5}$$
$$\sum_{h=1}^{H} A_{h,k} \cdot (\cos(h \cdot \Theta_k + \varphi_{h,k}) - \cos(h \cdot \Theta_f + \varphi_{h,f}))$$

is then calculated, the coefficients $A_{k,h}$ of the harmonics can be determined by an optimization method. For this purpose, $$\Theta_k - \Theta_f = a_{k,0} - a_{f,0} \tag{0.6}$$

as zeroth-order harmonic and $$\tilde{\Theta} \approx \Theta. \tag{0.7}$$

are introduced into equation (0.5); the latter on account of the small amplitude $\epsilon$ to be expected.

Consequently, the following applies to equation (0.5)

$$\vartheta_{k,l} = \eta_k - \eta_f + \sum_{h=0}^{H} A_{h,k} \cdot \left(\cos(h \cdot \tilde{\Theta}_k + \varphi_{h,k}) - \cos(h \cdot \tilde{\Theta}_f + \varphi_{h,f})\right) \tag{0.8}$$

By means of a compensatory calculation, it is possible to determine the values of $a_{h,k}$, $\phi_{h,k}$ and $\phi_{h,f}$ and thus to reconstruct the function $\epsilon$. Therefore, the angle errors of all the angular positions can be estimated using two angle heads. The calculation of the at least first eight or eleven harmonics normally suffices to achieve a high angle accuracy. The method can be extended to an arbitrary number of angle heads and the estimation is thereby also improved.

The angle heads can be mounted in a targeted manner for the measurement of specific harmonics ($\Omega_k$). Thus, e.g.

$$\Delta_{k,f} = \Omega_k - \Omega_f = 45 \text{ degrees} \tag{0.9}$$

is optimal for the measurement of the fourth harmonic. Other harmonics can also be determined with this angular position of the reading heads, but with a poorer signal-to-noise ratio than in the case of an optimal angular position.

In principle, the following relationship holds true:

$$a_h = 2 \cdot A_h \cdot \sin\left(\frac{h \cdot \Delta}{2}\right), \tag{0.10}$$

where $A_h$ is the real amplitude of the h-th harmonic, $a_h$ is the measured amplitude of the h-th harmonic and $\Delta$ is the angle formed between the reading heads under consideration.

By way of example, the fourth harmonic is measured at an angular position of 45 degrees with the amplitude $a_4 = 2 \cdot A_4$. However, the eighth harmonic cannot be detected at all with this arrangement, since $a_8 = 0$. As a further example, with this angular position of the reading heads, the sixth harmonic can be determined with an amplitude of $a_6 = 1.41 \cdot A_6$.

The radial movement of the code disk is fully incorporated in the calculation of the harmonics. This can lead, in the case of a poor bearing, to high noise components in the angle position values of the individual heads (higher value $\eta$). If, with respect to each angle head, a further angle head lying diametrically opposite is mounted and the average values of these head pairs in used for $\Theta_k$, then the radial movements cancel one another out and no longer appear as noise in the evaluation of equation (0.8).

On advantage of the method is also that the error function $\epsilon$ is continuous rather than discrete as is often the case in the prior art.

A set of coefficients determined in this way is stored. This set of coefficients can be used for a continuous online correction in the form of a calculation of a corrected measurement value on the basis of the coefficients during the measurement process. Alternatively, with the set of coefficients, a code table of the angle measuring device can also be corrected and it can be stored or a separate correction table can be created and stored. The two alternatives afford the advantage of a lower computational complexity during the measurement, but require more memory space.

In order to carry out a complete calibration, the angle measuring device merely has to be moved along its measurement range. In contrast to the prior art, it is not necessary to move to predetermined positions. It furthermore suffices to move the angle sensor for calibration by less than one full revolution. The minimum distance to be traveled for calibration results from the angular positions of the reading heads.

Further movement, beyond the minimum distance necessary for calibration, leads to redundant data. With the aid of such redundant data, it is possible, for example by means of averaging or a compensatory calculation, in the case of the values of the angle errors or series coefficients, additionally also to reduce non-systematic components and thus to further improve the accuracy of calibration.

On the basis of the set of coefficients determined, the measurement value is subsequently corrected during a measurement, and the harmonic errors mapped by the coefficients can thus be compensated for. Alternatively, it is also possible to modify a code table of the absolute value encoder on the basis of the coefficients, in order to directly compensate for the errors there and to reduce the calculation complexity during the determination of measurement values. The coefficients or the modified code table are/is stored either in volatile or in nonvolatile fashion by the angle sensor or by the evaluation unit thereof. Volatile storage requires a renewed calibration upon every switch-on or reset of the system, but this can be carried out at any time even by a layperson on account of the calibration method that is simple to perform.

Since no external aids and references are required for a calibration according to the invention the calibration can be carried out at any time and at any place, for example:
  during the assembly of the angle measuring system,
  when the angle measuring system is incorporated into a device,
  once when the device is put into operation,
  upon each occasion when the device is switched on,
  at predefined time intervals,
  when there is a change in the ambient conditions,
  after mechanical impacts, falls or vibrations,
  continuously during measurement operation taking account of calibration parameters which were determined during measurement operation and/or calibration parameters which were determined and stored during an earlier calibration.

Wherein in particular a calibration directly before measurement in the field is particularly advantageous in this case, since the current state and the ambient conditions of the measuring device are thus taken into account.

On the basis of the calibration parameters, it is also possible to determine an estimated value for the accuracy of the measuring system in order to qualitatively assess the measuring system, or the measuring system can assess itself with regard to the accuracy achievable by it and provide this information for further processing. Moreover, the calibration parameters can be monitored by the device and a warning or an indication of a possible lack of accuracy, necessary maintenance or other problems can be issued if an unexpectedly great change in the coefficients relative to earlier values occurs—for example caused by a misalignment of a reading head or of the code carrier.

During the measurement, it is also possible, as necessary, for one or more measuring heads to be deactivated or even removed. After the determination of the coefficients or the corrected code table, one reading head is sufficient for determining a value which is corrected on the basis of the calibration. However, a plurality of measuring heads enable here, too, an advantageous interpolation or averaging for further increasing the measuring accuracy.

For the self-calibration according to the invention, no special requirement is made of the accuracy of the known angular positions of the reading heads with respect to one another, since this can be determined in the course of the calibration of the angle measuring system on the basis of the difference between the absolute angle position values of the reading heads in an arbitrary angular position as reference angular position. During this determination, it is also possible, for example, to employ averaging of a plurality of read values, also in different angular positions, for the purpose of reducing errors. The angular distance between the reading heads—or the known angular positions of the reading heads—may therefore indeed only be known approximately, if necessary also not at all, before the calibration and may only be determined in the course of the calibration method. Consequently, the term "known" also concomitantly includes the implicit knowledge on account of the determinability.

However, the angular positions of the reading heads have to remain unchanged during the determination of the set of coefficients, where reading heads which are fixedly mounted in a device can be taken as a basis to a great extent. On account of the closed angle circle to be regarded as closed, an angular distance between two reading heads with more than 180 degrees can also be described by means of the complementary angle. By way of example, an angular distance of more 180 degrees in the embodiments described here is measured in the other direction and, consequently, the maximum possible angular distance can also be regarded as 180 degrees and not 360 degrees.

A further advantage of the method according to the invention is that, by virtue of the fixedly positioned reading heads, a stabler angular position can be achieved than is possible in the case of an external positioning of the angle sensor, since a positioning always has both absolute positioning errors and reproducibility errors in a manner governed by the system.

BRIEF SUMMARY OF THE FIGURES

The method according to the invention and the apparatus according to the invention are described in greater detail below purely by way of example on the basis of concrete exemplary embodiments illustrated schematically in the drawings, further advantages of the invention also being discussed. More specifically:

FIG. 3a shows an embodiment of an angle measuring system according to the invention with two reading heads respectively arranged opposite, and a further, individual reading head, FIG. 3b shows an embodiment of an angle measuring system according to the invention with two reading heads arranged diametrically, and two further reading heads in different angular positions.

DETAILED DESCRIPTION OF SEVERAL EMBODIMENTS

Figure 1:
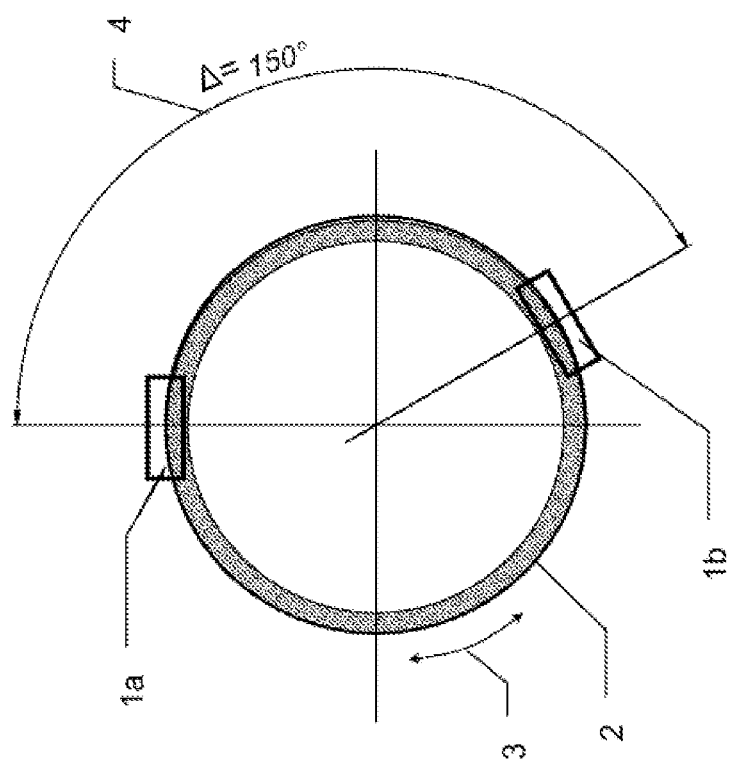
FIG. 1a shows an embodiment of an angle measuring system according to the invention with two reading heads arranged at an angle Δ of 150° with respect to one another.
FIG. 1b shows by way of example a tabular representation of the weighting factors with which harmonics can be determined with the arrangement illustrated in FIG. 1a, FIG. 2 shows an embodiment of an angle measuring system according to the invention with two reading head pairs respectively arranged diametrically.

A possible embodiment of the angle measuring system according to the invention can be seen in a schematic illustration in FIG. 1a.

There becomes an angle measuring system 7 comprising
a code carrier 2 carrying an absolute position code, and
at least two reading heads 1a, 1b, which have a fixed, known angular position 4 having an angular distance, in particular of more than 50 degrees, for example of 70 to 180 degrees, preferably of 140 to 170 degrees, for example of 150 degrees, relative to one another and in each case suitable for detecting the position code at least partially, such that an absolute angular position value of the respective reading head 1a, 1b relative to the code carrier 2 can be determined, and wherein the code carrier 2 is rotatable relative to the reading heads 1a, 1b, and different angular positions 3 of the code carrier 2 relative to the reading heads 1a, 1b can thus be assumed, and
an evaluation unit for carrying out the calibration method according to the invention and/or the angle measuring method according to the invention, which is not illustrated.

Two reading heads 1a and 1b for detecting the position code situated on the code carrier 2 are illustrated. They are arranged, by way of example, in a manner spaced apart from one another in an angular position 4 of 150°. An evaluation unit, not illustrated here, determines an angle position value in each case on the basis of the position code at least partially detected by the reading head, 1a, 1b, said angle position value being dependent on the position of the code carrier 2 relative to the reading head 1a, 1b. As indicated by the arrow 3 for illustration purposes, the code disk 2 is mounted such that it is rotatable in one degree of freedom relative to the reading heads 1a, 1b.

In this case, the reading heads 1a, 1b are embodied such that their angle position value relative to the code carrier 2 can be determined absolutely within one revolution or part of a revolution. In this exemplary embodiment, the angular position 4 of the reading heads 1a and 1b with respect to one another is 150°, as indicated. Consequently, in the ideal, error-free case, the difference between the angle position values of the reading heads 1a and 1b also makes up 150°. In practice, an angle error can be determined on the basis of a comparison of the difference between the angle position values with the angular position.

By rotating the code disk 2 relative to the reading heads 1a, 1b the angular position is varied. In this case, the angle error is determined for a multiplicity of angular positions. This is preferably done with approximately uniform distribution over the angular positions of the entire measurement range. This would ideally be carried out for every angular position at which a different angle position value can be determined, but in practice this can be realized only with difficulty and is not required either for the method. It suffices merely to cover subranges of the measurement range with a defined density in order to carry out the calibration method.

The angle errors obtained in this case are expanded e.g. in a mathematical series. By way of example a Fourier series is suitable for this since its coefficients represent harmonics of a fundamental period and these are therefore highly suitable for mapping errors of a rotary encoder which are periodic with respect to a revolution.

As an alternative to a Fourier series, which will be discussed in more specific detail by way of example for elucidating the method in the further description, other mathematical functions, series and models can likewise be employed for qualifying the angle errors. The parameters of this general function then correspond in terms of their function to the coefficients (presented in the description) of the harmonics of the Fourier series and can be determined for example by one of the many known parameter estimation methods or an optimization calculation.

In this case, the angular positions of the reading heads are chosen in such a way that at least one of the angular distances between the respectively adjacent reading heads differs from at least one, in particular from all, of the angular distances between the remaining/further reading heads, as a result of which, in particular, no totally symmetrical arrangement of the reading heads along the circumference of the code carrier is provided. Consequently, no rotationally symmetrical arrangement is involved since the distances between the reading heads are unequal. The reading heads do not have identical interspaces along the code carrier.

According to the invention, by way of example, in the case of N reading heads, at least N−1 distances between the reading heads differ from one another, as a result of which a determinability of harmonics up to an order ≥N is made possible.

In other words, in accordance with the present invention, none of the angular distances should correspond to another angular distance, that is to say that the complaints of the reading heads are different.

Two identical angular distances between reading heads can admittedly make possible, as a result of the determinability of redundant information, an improvement in the accuracy, for example as a result of interpolation, which does not preclude the application thereof per se, but reading heads spaced apart identically nevertheless generally do not contribute to the determinability of additional harmonic errors in accordance with the invention.

By way of example, it may be endeavored to make all the distances between the reading heads different and to choose the latter in such a way that the weighting factors resulting from the angular distances in accordance with the formula 0.10 turn out to be as large as possible for all harmonics to be determined and particularly in the joint consideration of the harmonics to be determined over all angular distances do not turn out to be zero for any harmonic for all angular distances that can be evaluated. Thus, by way of example, in the case of an expected uniform distribution of the errors over the harmonics to be determined over all angular distances, a corresponding uniform distribution of the sum of the weighting factors per harmonic to be determined may be striven for. The mathematical principles for calculating a corresponding angular distance division for a specifically desired combination of number of reading heads, number of harmonics to be determined and the weighting factors thereof (e.g. on account of an expected error distribution) are sufficiently known from the literature.

FIG. 1b illustrates the weighting factors of harmonics in the case of a Fourier series for the arrangement of the reading heads with an angular position of 150° from FIG. 1a in tabular form.

In this case, the first column h indicates the order of the harmonics and the column a/A (150°) indicates the associated weighting factor of these harmonics in the range of 0% to 100%. In this case, a weighting factor of 100% stands for the complete detectability of these harmonics and 0% stands for a harmonic that cannot be detected with this arrangement. These weighting factors crucially influence the achievable signal-to-noise ratio (SNR) when determining the harmonics. Consequently, the weighting factors also determine the maximum achievable accuracy of the coefficient values of the harmonics.

It can be seen from the table that harmonics up to the eleventh order can be determined throughout with an angular position of 150°. In this case, the 1st, 4th, 6th, 8th and 11th harmonics can be determined with a comparatively good SNR by virtue of their high weighting factor. The 12th harmonic cannot be determined with this arrangement since its weighting factor is 0%.

Consequently, at 150 degrees, the first harmonic up to the eleventh harmonic can be determined continuously, but with different signal-to-noise ratio.

The angle of 150 degrees was chosen here by way of example. It goes without saying that any other angles can be chosen, for example in order to be able to detect harmonics of a desired order with the highest possible quality if such a requirement is known. In the case of a very small angular distance between the reading heads of less than 50 degrees, however, the weighting factors of the low harmonics, in particular of the first harmonic, are very small. Therefore, with small angular positions of less than 50 degrees, typical errors of rotary encoders such as
- unbalance,
- eccentricity,
- wobbling errors,
- bearing errors,
- thermal or mechanical warpage of the code carrier can only be detected with restricted accuracy.

The principle can also be extended to more than two reading heads and to permutations thereof, in order to be able to detect further harmonics or some harmonics multiply and thus to be able to determine the angle errors even better.

In this case, the coefficients obtained in the series expansion represent the error in the form of harmonic components over the periodic measurement range of one revolution. A measurement value of the angle measuring system can be corrected on the basis of the coefficients and the angle position value of the reading head. As an alternative thereto, it is also possible, with the coefficients, directly to modify a code table used during the absolute value determination or to create a correction table with respect to the code table and thus to dispense with correction calculations during measurement operation.

For complete calibration, the angle sensor has to be rotated by a specific, minimal angle dependent on the angle positions of the reading heads. As a result, the coefficients of the harmonics can be detected. The redundant data determined by rotation going beyond that, which data, for example by means of a compensatory calculation, can be utilized also for reducing non-systematic errors and for further improving the accuracy of the calibration.

After calibration has been effected, during a measurement it is also possible for one or a plurality of the reading heads to be deactivated or even removed. As a result, by way of example, the current consumption can be reduced and/or the evaluation speed increased.

The calibration of the angle measuring system can be effected at a wide variety of points in time, in particular:
- during the assembly of the angle measuring system,
- after the angle measuring system has been mounted in a device,
- continuously during measurement operation,
- when the device is first switched on,
- upon each occasion when the device is switched on,
- in cyclic or acyclic time intervals,
- when there is a change in the ambient conditions,
- after impact or shock stresses,
- at regular service intervals,
- continuously during measurement operation taking account of calibration parameters which were determined during measurement operation and/or calibration parameters which were determined and stored during an earlier calibration.

The calibration method or evaluation method is performed advantageously, at least in part, by a computer program product stored on a machine-readable carrier. By way of example, this can be done by means of a microcontroller, digital signal processor, FPGA or ASIC, wherein the corresponding program code can be provided for example by a device-internal memory, by external storage media or by means of electromagnetic waves.

Figure 2:
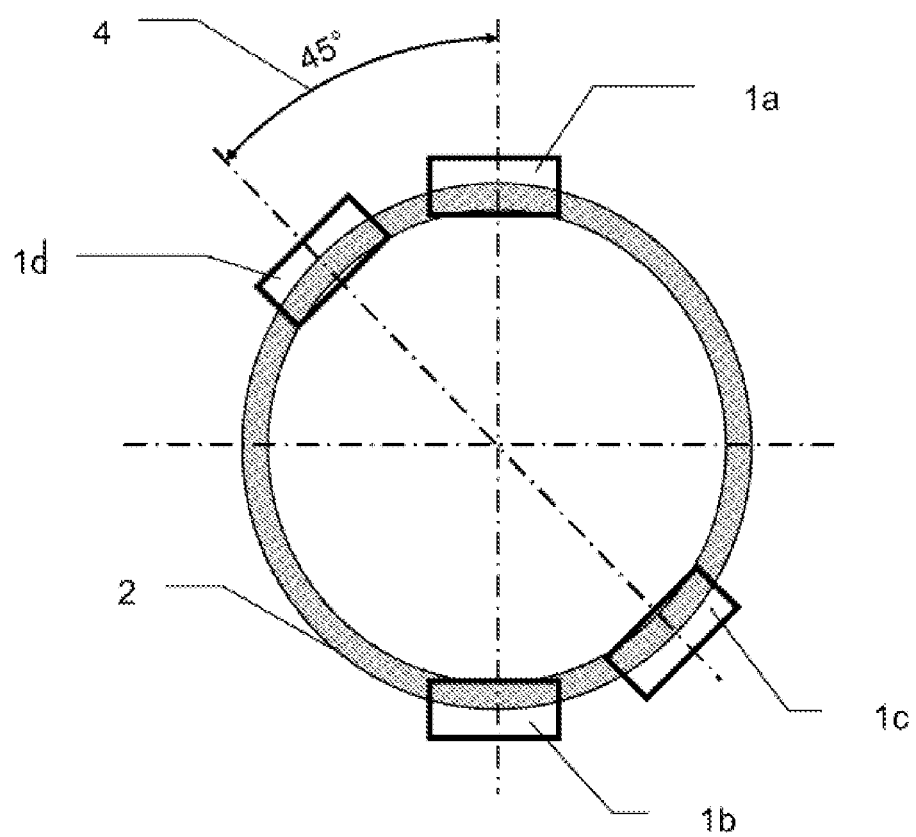

FIG. 2 illustrates in schematic form a further embodiment of an angle measuring system according to the invention. It symbolizes one of the many alternative embodiments comprising a plurality of reading heads 1a, 1b, 1c, 1d, which can be fitted in a wide variety of positions with respect to one another. In this case, the calibration method can be performed analogously to the sequence described with respect to FIG. 1.

By way of example, the angle measuring device illustrated in this figure can, by virtue of a double 180° arrangement of the reading heads 1a and 1b, and respectively 1c and 1d, be determined particularly the 1st harmonic repeatedly and with full resolution. As a result of the 45° degrees arrangement 4 of the pairs among one another, it is furthermore possible specifically to determine the 4th harmonic with full resolution. As a result of the permutation already mentioned, by way of example an angle of 225° can also be evaluated. As a result of the double arrangement in pairs, a double evaluation is effected and, consequently, a further increase in the accuracy of the measurement value can be obtained by using a compensatory calculation, for example averaging. Here, too, the angle of 45° is only one possibility chosen by way of example from any desired angles.

FIG. 3a shows a further embodiment with three reading heads 1a, 1b, 1c, in which case, however, only two reading heads 1a and 1b are arranged as an opposite pair and the remaining reading head 1c is arranged in an angular position in which it is possible to determine as many harmonic errors as possible of this measuring system with a significant proportion. By means of such an arrangement, the dominant errors of the measuring system which are to be expected in a structurally governed fashion can be determined with high accuracy.

FIG. 3b shows a further arrangement of four reading heads 1a, 1b, 1c, 1d as an example of a further embodiment of an angle sensor according to the invention. As indicated schematically by the dash-dotted lines as angular positions of the reading heads, this arrangement of the reading heads 1a, 1b involves two opposite reading heads which detect the position code at two angle positions offset by 180°. An accurate detection of the first harmonic is thus achieved. In the case of this arrangement, two further reading heads 1c, 1d in further angular positions achieve an accurate detection also of those harmonics which cannot be detected by the 180° arrangement. In this case, it is possible to determine the angle errors respectively with all possible combinations of two of the reading heads 1a, 1b, 1c, 1d and, consequently, for example by means of a compensatory calculation, it is possible to combine the coefficients that were calculated with 6 angular positions spaced apart differently.

Figure 4:
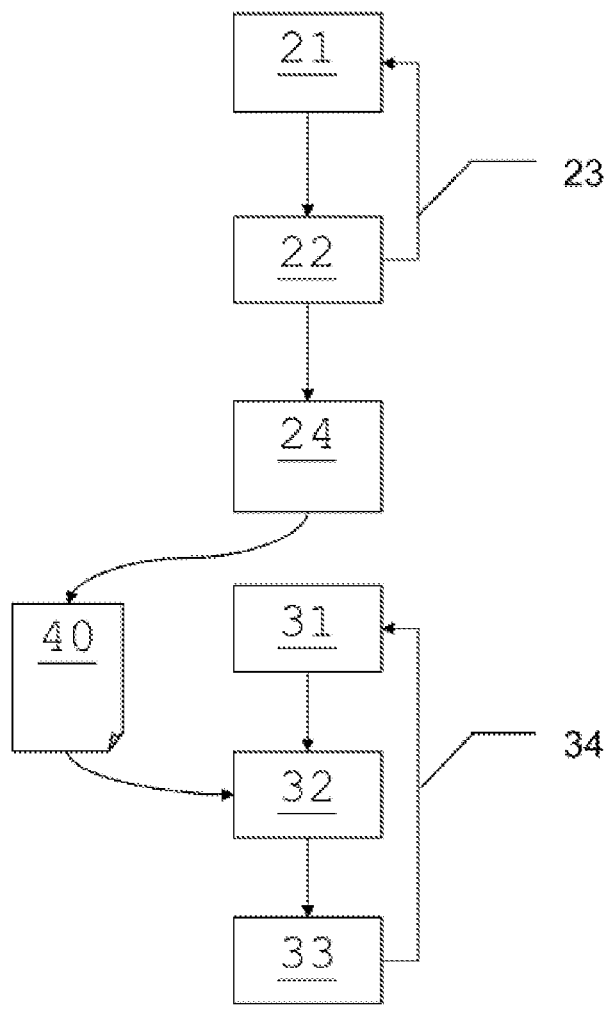
FIG. 4 shows a flowchart of the calibration method and of the angle measuring method.

FIG. 4 illustrates a flowchart of the calibration method by the blocks 21 to 24 and of the angle measuring method by the blocks 31 to 34.

The illustration shows the calibration method according to the invention that can be carried out without a reference system for an angle measuring device 7 comprising a code carrier 2 carrying an absolute position code, and at least two reading heads 1a, 1b, 1c, 1d which have a fixed, known angular position 4 having a different angular distance, in particular of more than 50 degrees, for example of about 150 degrees, relative to one another and in each case detect the position code at least partially, such that an absolute angular position value of the respective reading head 1a, 1b, 1c, 1d relative to the code carrier 4 can be determined.

The code carrier 4 is rotatable relative to the reading heads 1a, 1b, 1c, 1d and different angular positions 3 of the code carrier 4 relative to the reading heads 1a, 1b, 1c, 1d can thus be assumed.

By means of the following steps:
  determining the angle position values 21 of the reading heads 1a, 1b, 1c, 1d in one angular position,
  determining an angle error 22 by comparing the difference between the angle position values of the reading heads with the known angular position 4 of the reading heads 1a, 1b, 1c, 1d with respect to one another,
  repeating the steps of determining 23 the angle position values and the angle error for a multiplicity of varying angular positions, and
  carrying out a mathematical evaluation method 24 comprising
    determining the parameters of a mathematical function quantifying the angle errors,
    determining calibration parameters 40 as the parameters of the quantifying mathematical function or as a correction or code table which is derived from the parameters.
the calibration method is carried out.

The associated angle measuring method for determining an angle measurement value with the aid of the angle measuring device 7, which comprises a code carrier 2 carrying an absolute position code, and at least two reading heads 1a, 1b, 1c, 1d which have a fixed, known angular position 4 having different angular distances, in particular of more than 50 degrees, for example of 70 to 180 degrees, preferably of 140 to 170 degrees, for example of 150 degrees, relative to one another and in each case detect the position code at least partially, such that an absolute angular position value of the respective reading head relative to the code carrier can be determined.

The code carrier 2 is rotatable relative to the reading heads and different angular positions of the code carrier relative to the reading heads can thus be assumed.

By means of the following steps:
  determining an angle position value 31 by means of at least one of the reading heads which detects at least one part of an absolute position code of a code carrier;
  determining the angle measurement value 32 by correcting the angle position value on the basis of calibration parameters 40 determined in the context of the calibration method;
the angle measurement value 33 is provided, and this sequence is repeated 34.

The block 21 represents the step of determining the angle position values of the reading heads in an angular position.

This is followed by—symbolized by the block 22—determining an angle error by comparing the difference between the angle position values of the reading heads with the known angular position of the reading heads with respect to one another.

The arrow 23 symbolizes the step of repeating the process of determining the angle position values and the angle error of a multiplicity of varying angular positions, which is carried out, in particular, until repeating the steps of determining the angular position values and the angle error takes place in a measurement range of the angle measuring system, which measurement range is subdivided into subranges, a number of times such that specific subranges are covered by the varying angular positions with a defined density, in particular wherein the angular positions are distributed approximately uniformly over said specific subranges.

Block 24 symbolizes carrying out a mathematical evaluation method by expanding the angle errors determined for the respective angular positions in a mathematical series and determining calibration parameters as a set of coefficients of the mathematical series or as a correction or code table which is derived from the set of coefficients, and is represented by block 40.

The first step of the evaluation method is symbolized by block 31 and shows the step of determining an angle position value by means of at least one of the reading heads which detects at least one part of an absolute position code of a code carrier.

Block 32 implements the step of determining the angle measurement value by correcting the angle position value on the basis of calibration parameters from block 40 determined in the context of the calibration method.

Finally, block 33 stands for providing the angle measurement value, and the arrow 34 stands for possible repetition of the angle measurement.

Figure 5:
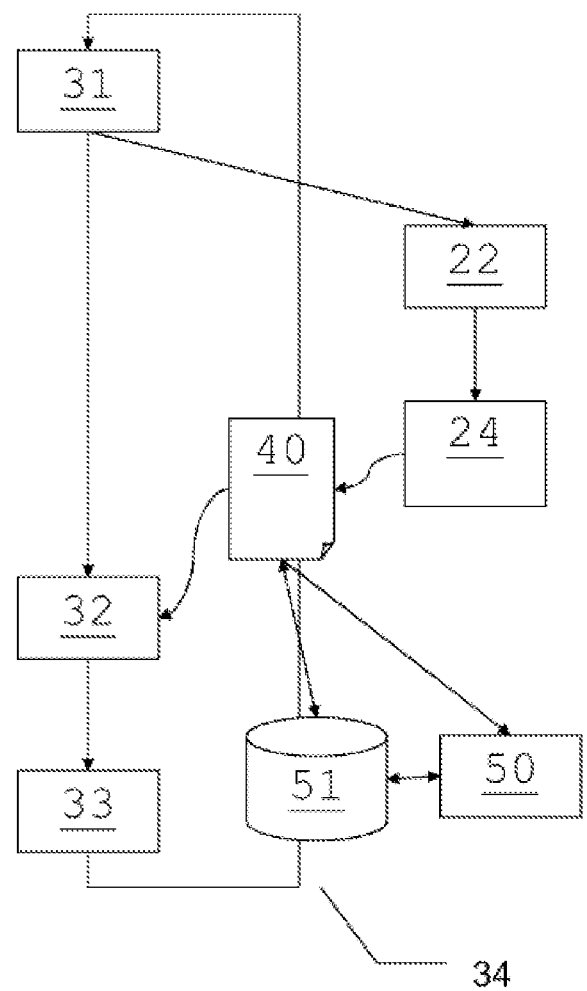
FIG. 5 shows a flowchart of the calibration method and of the angle measuring method in the case of continuous calibration.

FIG. 5 illustrates a flowchart of the calibration method, representing the sequence of a continuous calibration in parallel with measurement operation.

The angle position values which are detected in the step represented by block 31 are in this case first corrected in block 32 on the basis of the calibration parameters from block 40 and are then provided for further processing in block 33.

In parallel with the correction of the angle position values, on the basis thereof in block 22 the determination of the calibration parameters from block 40 is performed or the values thereof are increased by continuous adaptation in terms of their accuracy. The arrow 34 symbolizes the repeated iteration of the sequence during measurement operation.

In this case, the values of the calibration parameters can optionally be fed to a further evaluation (represented by block 50), which, for example in the case of abrupt changes in values, can initiate a warning or determine an estimated value for the accuracy of the angle measuring device from these values.

The calibration parameters can also optionally be stored in a memory 51, for example in order already to have start values upon switch-on, to be able to identify a misalignment by comparison of the determined and stored values, or the like.

The two optional functions, represented by 50 and 51, respectively, can analogously also be included in the sequence illustrated in FIG. 4.

Figure 6:
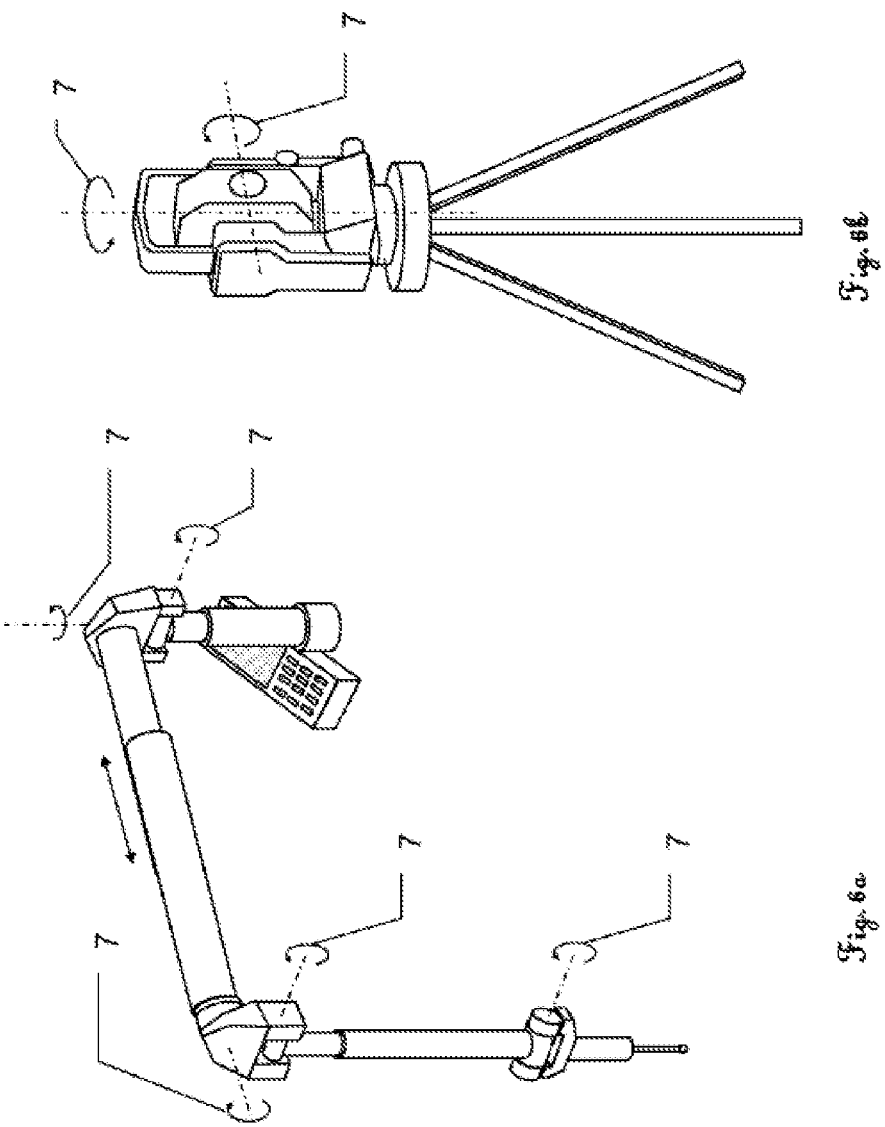
FIG. 6a shows by way of example the use of a plurality of angle measuring systems according to the invention in an articulated arm.
FIG. 6b shows by way of example the use of two angle measuring systems according to the invention in a geodetic measuring device.

FIG. 6a shows by way of example a use of angle measuring systems 7 according to the invention, symbolized by their rotation axes and an arrow for representing the rotatability, in an articulated arm coordinate measuring device for measurement tasks.

FIG. 6b illustrates by way of example a geodetic measuring device which uses two angle measuring systems 7 with the calibration method according to the invention. This device can be calibrated or recalibrated during or before use in the field or after an explicit starting of the calibration by single or multiple traversal of the measurement range or parts thereof.

Figure 7:
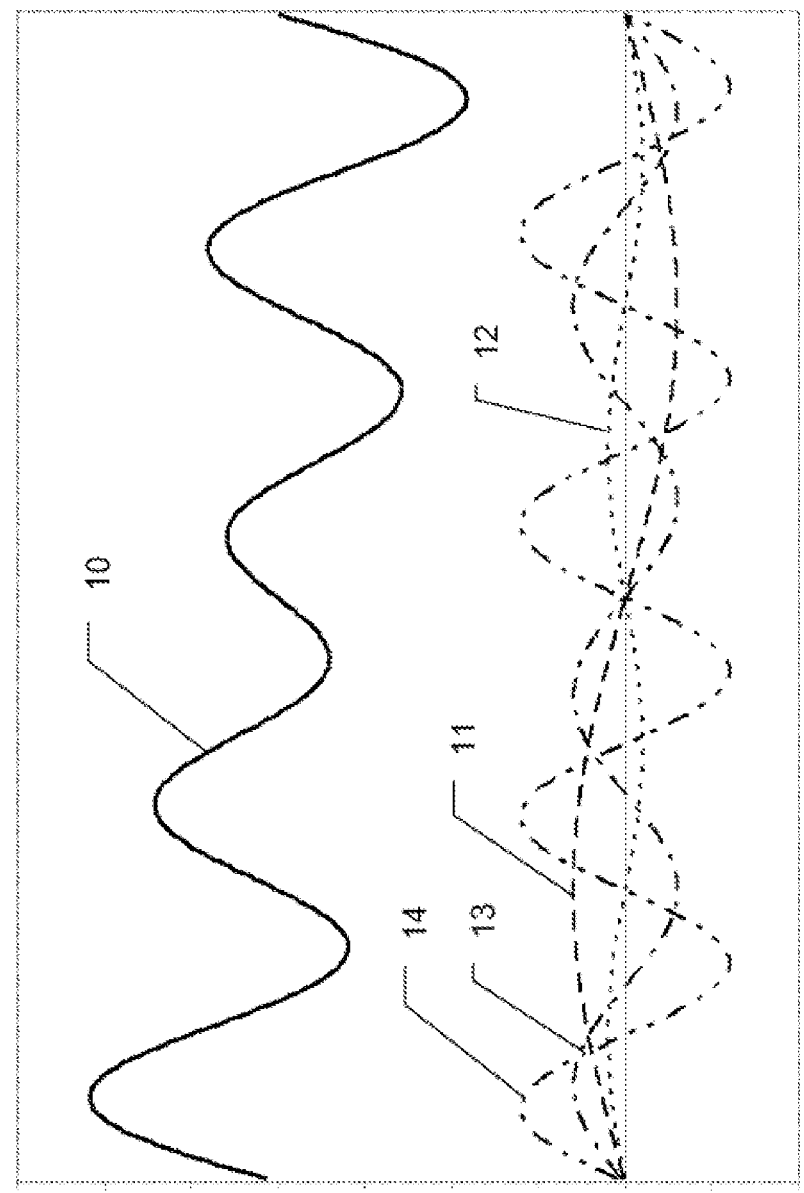
FIG. 7 shows by way of example a representation of the errors of an angle measuring device as a Fourier series.

FIG. 7 shows by way of example a graphical illustration of a series expansion of an angle error 10 into a first to fourth harmonic oscillation 11, 12, 13, 14.

Figure 8:
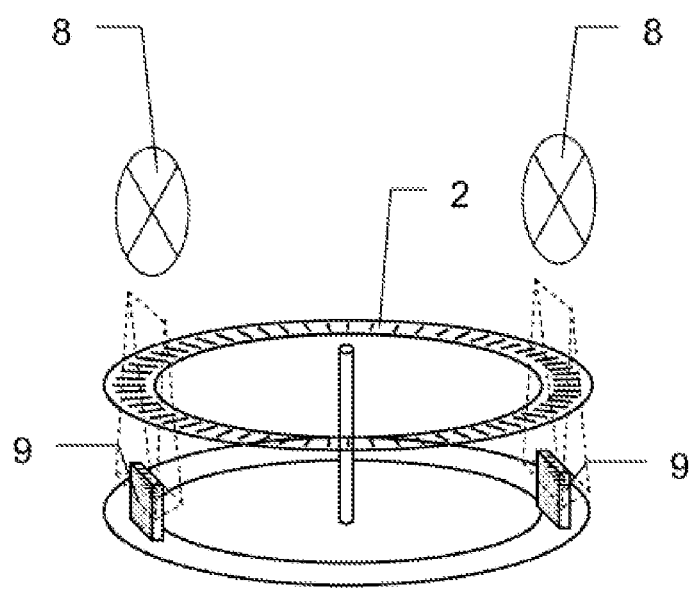
FIG. 8 shows an exemplary embodiment of an angle measuring system according to the invention with optoelectronic reading heads.

A schematic illustration of an embodiment of optoelectronic reading heads that can be used in this method is illustrated by way of example in FIG. 8. In this case, a projection of a position code onto an optoelectronic sensor element 9 is specifically illustrated.

In this case, the position code is illustrated in the form of a code disk 2 operated in the transmitted-light method. By way of example, code detection on the basis of reflection, imaging, shadow casting, holography, by means of self-luminous encoding, or other known methods, could likewise be used for this purpose.

Optical deflection and diffraction by mirrors, lens systems, concave mirrors or any desired combination of such elements can also be realized.

In this case, by way of example, LED, lasers, laser diodes, incandescent lamps, or other components which emit electromagnetic radiation can be used as the light source 8. In addition, the radiation thereof can also be guided via lenses and deflection systems.

The position code can be embodied in the form of light-dark patterns, Moiré patterns, barcodes, a two-dimensional code, etc.

As encoding, all types of code which permit an absolute position to be determined are suitable, such as, for example, maximum sequences, a wide variety of binary encodings, analog intensity profiles, etc.

In general, the reading head must be able to make the position code or parts thereof electronically evaluatable. In this example, this is done by means of an optical sensor line 9, realizable for example as an arrangement of photodiodes or as a CCD chip. Whether the position code is converted into electrical signals in the form of optical, magnetic, capacitive read-out in one-dimensional, two-dimensional, three-dimensional form is not of importance for the calibration method.

What is claimed is:

1. An angle measuring device calibration method to be carried out without a reference system, with the angle device including:

a code carrier carrying an absolute position code; and at least N≥2 reading heads which have a fixed, known angular position in an angular distance relative to one another, wherein a subset of the N≥2 reading heads are unequally spaced relative to an adjacent reading head of the N≥2 reading heads around the circumference of the code carrier, and each reading head built for detecting the position code at least partially, such that an absolute angular position value of the respective reading head relative to the code carrier can be determined, wherein the code carrier is rotatable relative to the reading heads and different angular positions of the code carrier relative to the reading heads can thus be taken, the method comprising:

determining the absolute angle position values of the reading heads in an angular position, determining an angle error by comparing the difference between the absolute angle position values of the reading heads with the known angular position of the reading heads with respect to one another, repeating the steps of determining the absolute angle position values and the angle error for a multiplicity of varying angular positions, and carrying out a mathematical evaluation method comprising:

determining parameters of a mathematical function quantifying the angle errors, determining calibration parameters as the parameters of the quantifying mathematical function or as a correction or code table which is derived from the parameters; and calibrating the angle measuring device with the calibration parameters.

2. The calibration method as claimed in claim 1, wherein the angular positions of the reading heads are chosen in such a way that at least one of the angular distances between respectively adjacent reading heads differs from at least one of the remaining N−1 angular distances.

3. The calibration method as claimed in claim 2, wherein all N angular distances are different.

4. The calibration method as claimed in claim 1, wherein the determination of the parameters of the quantifying mathematical function is effected by a parameter estimation on the basis of an optimization method.

5. The calibration method as claimed in claim 1, wherein:

the determination of the parameters of the quantifying mathematical function is effected by a parameter estimation on the basis of an optimization method, and the quantifying mathematical function is a Fourier series, and represents the parameters by expansion of the angle errors determined for the respective angular positions the coefficients of all harmonic oscillations up to an order ≥N of the angle error.

6. The calibration method as claimed in claim 1, wherein repeating the steps of determining the angular position values and the angle error takes place in a measurement range of the angle measuring system, which measurement range is subdivided into subranges, in such a way that specific subranges are covered by the varying angular positions with a defined density.

7. The calibration method as claimed in claim 6, wherein the angular positions are distributed approximately uniformly over said specific subranges and the angular position values are detected simultaneously at the reading heads.

8. The calibration method as claimed in claim 1, wherein:

in addition a determination of misalignments by monitoring the calibration parameters for change; and/or a derivation of an estimated value for the accuracy of the angle sensor on the basis of the calibration parameters are/is carried out.

9. The calibration method as claimed claim 1, wherein the angle position value and/or the angle error are/is determined multiply in the same angular position and these are averaged before the mathematical evaluation method is carried out.

10. The calibration method as claimed claim 1, wherein the angle position value and/or the angle error are/is determined multiply in the same angular position and these are averaged before the mathematical evaluation method is carried out by means of a compensatory calculation according to the least squares method, or the calibration method is performed multiply and an optimization method is carried out for the sets of coefficients obtained in the process.

11. The calibration method as claimed in claim 1, wherein the angular position of the reading heads is determined on the basis of a difference between the angle positions in an arbitrary reference angular position.

12. The calibration method as claimed in claim 1, wherein the angular position of the reading heads is determined by averaging the differences over a plurality of arbitrary reference angular positions.

13. The calibration method as claimed in claim 1, wherein: the angular position of the reading heads is chosen in such a way that the dominant angle errors, which supply a significant error proportion, including:
    errors caused by eccentricity,
    errors in the code division of the code disk, and/or
    errors owing to changing ambient influences,
    are contained in the qualifying mathematical function with an error proportion of at least 25%.

14. The calibration method as claimed in claim 1, wherein the angle positions are determined with reading heads arranged symmetrically in each case in pairs.

15. The calibration method as claimed in claim 1, wherein the reading heads are embodied as optical, electro-optical, magnetic, or capacitive reading heads.

16. An angle measuring method for determining an angle measurement value with the aid of an angle measuring device, wherein the angle measuring device includes:
    a code carrier carrying an absolute position code, and
    at least $N \geq 2$ reading heads which have a fixed, known angular position having an angular distance, wherein a subset of the $N \geq 2$ reading heads are unequally spaced relative to an adjacent reading head of the $N \geq 2$ reading heads around the circumference of the code carrier, and in each case detect the position code at least partially, such that an absolute angular position value of the respective reading head relative to the code carrier can be determined, wherein the code carrier is rotatable relative to the reading heads and different angular positions of the code carrier relative to the reading heads can thus be assumed, the method comprising the following steps:
        determining an angle position value by means of at least one of the reading heads, which detects at least one part of an absolute position code of a code carrier;
        determining the angle measurement value by correcting the angle position value on the basis of calibration parameters determined in the context of a calibration method as claimed in claim 1; and
        providing the angle measurement value.

17. The angle measuring method as claimed in claim 16, wherein in addition to the calibration method as claimed in claim 1 is carried out:
    during assembly of the angle sensor,
    after the mounting of angle sensor in a device,
    upon each occasion when the device is switched on,
    in cyclic or acyclic time intervals,
    in a manner initiated by the user,
    when there is a change in the ambient conditions,
    after impact or shock stresses,
    at regular service intervals and/or
    continuously during measurement operation,
    taking account of calibration parameters which were determined during measurement operation and/or were determined during an earlier calibration and stored.

18. Angle measuring method as claimed in claim 17, wherein after the calibration method has been performed, one reading head or a plurality of reading heads is/are deactivated or removed.

19. An angle measuring device comprising:
    a code carrier carrying an absolute position code,
    at least $N \geq 2$ reading heads which have a fixed, known angular position having an angular distance, wherein a subset of the $N \geq 2$ reading heads are unequally spaced relative to an adjacent reading head of the $N \geq 2$ reading heads around the circumference of the code carrier, and in each case are suitable for detecting the position code at least partially, such that an absolute angular position value of the respective reading head relative to the code carrier can be determined, and wherein the code carrier is rotatable relative to the reading heads and different angular positions of the code carrier relative to the reading heads can thus be assumed, and
    an evaluation unit for carrying out the following steps of a calibration method including:
        determining an angle error by comparing the difference between the angle position values of the reading heads with the known angular position of the reading heads with respect to one another;
        repeating the steps of determining the angle position values and the angle error for a multiplicity of varying angular positions;
        carrying out a mathematical evaluation method comprising
        determining the parameters of a mathematical function quantifying the angle errors;
        determining calibration parameters as the parameters of the quantifying mathematical function or as a correction or code table which is derived from the parameters;
        and/or at least the following steps of the angle measuring method of claim 16 including:
            determining the angle measurement value by correcting the angle position value on the basis of calibration parameters determined in the context of the calibration method of claim 1;
            providing the angle measurement value.

20. A computer program product stored on a machine-readable carrier, comprising program code for carrying out the following steps of the calibration method as claimed in claim 1:
    determining the angle error by comparing the difference between the angle position values of the reading heads with the known angular position of the reading heads with respect to one another, wherein the angular positions of the reading heads are chosen in such a way that at least one of the angular distances between respectively adjacent reading heads differs from at least one of the remaining $N-1$ angular distances;
    repeating the steps of determining the angle position values and the angle error for a multiplicity of varying angular positions;

carrying out a mathematical evaluation method comprising:
  determining the parameters of a mathematical function quantifying the angle errors;
  determining calibration parameters as the parameters of the quantifying mathematical function or as a correction or code table which is derived from the parameters;
and/or at least the following steps of the angle measuring method as claimed in claim 16:
  determining the angle measurement value by correcting the angle position value on the basis of calibration parameters determined in the context of the calibration method as claimed in claim 1;
  providing the angle measurement value.

21. The calibration method as claimed in claim 1, comprising determining a corrected measurement value by applying the calibration parameters to at least one of the absolute angle position values and output the corrected measurement value for further processing.

22. The calibration method as claimed in claim 1, wherein the angular position of the reading heads having an angular distance of more than 50 degrees.

23. The calibration method as claimed in claim 1, wherein the angular position of the reading heads having an angular distance of 70 to 180 degrees.

24. The calibration method as claimed in claim 1, wherein the angular position of the reading heads having an angular distance of 140 to 170 degrees.

25. The calibration method as claimed in claim 1, wherein the angular position of the reading heads having an angular distance of 150 degrees.

26. The calibration method as claimed in claim 1, wherein interspaces between the reading heads are not the same.

27. The calibration method as claimed in claim 1, wherein each angular distance relative to another reading head is different.

28. The calibration method as claimed in claim 1, wherein at least one of the reading heads is not arranged equally spaced with respect to another reading head along the circumference of the code carrier.

* * * * *